(12) United States Patent
Stol et al.

(10) Patent No.: US 7,281,647 B2
(45) Date of Patent: Oct. 16, 2007

(54) FRICTION STIR WELD REPAIR

(75) Inventors: Israel Stol, Pittsburgh, PA (US); Eric M. Stull, Delmont, PA (US)

(73) Assignee: Alcoa Inc., Pittsburgh, PA (US)

( * ) Notice: Subject to any disclaimer, the term of this patent is extended or adjusted under 35 U.S.C. 154(b) by 201 days.

(21) Appl. No.: 10/875,106

(22) Filed: Jun. 22, 2004

(65) Prior Publication Data

US 2005/0279810 A1   Dec. 22, 2005

(51) Int. Cl.
*B23K 2/12* (2006.01)
(52) U.S. Cl. .................. 229/112.1; 228/2.1; 228/119
(58) Field of Classification Search ................ 228/2.1, 228/112.1, 114.5; 29/402.01, 402.08, 402.09
See application file for complete search history.

(56) References Cited

U.S. PATENT DOCUMENTS

| | | | |
|---|---|---|---|
| 3,487,530 A * | 1/1970 | Ely .............................. 228/119 |
| 5,460,317 A | 10/1995 | Thomas et al. ........... 228/112.1 |
| 5,971,252 A * | 10/1999 | Rosen et al. .............. 228/112.1 |
| 5,975,406 A | 11/1999 | Mahoney et al. ......... 228/112.1 |
| 6,638,641 B2 * | 10/2003 | Delano ........................ 428/599 |
| 2003/0217452 A1 * | 11/2003 | Talwar et al. ............. 29/402.14 |

\* cited by examiner

*Primary Examiner*—Jonathan Johnson
(74) *Attorney, Agent, or Firm*—Greenberg Traurig LLP; Peter J. Borghetti (57) ABSTRACT

A method of repairing a discrepancy in a casting, weldment or other workpiece comprised of a material characterized by thermoplastic properties includes excising the discrepancy by cutting, milling, or otherwise removing workpiece material surrounding the discrepancy so as to remove the discrepancy and form a cylindrical hole in the workpiece. The method further includes placing a cylindrical plug in the cylindrical hole and moving a friction stir welding tool around the circumference of the plug to weld the plug to the workpiece.

29 Claims, 10 Drawing Sheets

FRICTION STIR WELD REPAIR

FIELD OF THE INVENTION

The present invention relates to friction stir welding for repair of discrepancies in weldments, castings and other entities and, more particularly, it relates to friction stir welding for repair of a friction stir weld.

BACKGROUND OF THE INVENTION

U.S. Pat. No. 5,460,317 is a classic reference on friction stir welding. In particular, it cites the use of a non-consumable probe comprised of a material which is harder than the workpieces being joined. (The probe should remain hard at elevated temperatures which are sufficient to soften the workpieces.) In a typical application, the method is used for butt welding. The probe is rotated relative to the workpieces and is pressed against the workpieces at the juncture between two workpieces. Friction between the probe and the workpieces generates heat which plasticizes the workpieces and permits the probe to enter.

The workpieces are not melted by this procedure, but are softened (i.e. plasticized) sufficiently for flow to occur. Oxidation problems are thus avoided. After the probe has been plunged into the joint between the workpieces, and the portions of the workpieces in the immediate vicinity of the probe are plasticized, the probe is translated along the interface between the two workpieces, thereby thoroughly intermingling the two workpieces. It is noted that the plasticized material flows around the axis of the rotating probe whereby thorough mixing occurs.

This patent also teaches repair of a crack by plunging a rotating probe into the workpiece at the site of a crack, and translating it along the crack. Plasticized material on both sides of the crack is thoroughly intermingled to repair the crack.

U.S. Pat. No. 5,971,252 presents a process to repair voids in an aluminum alloy, particularly a friction stir weld in an aluminum alloy. For an elongated void, the method includes machining a trough that subsumes the void. A strip of material having the same composition as the alloy to be repaired and having sufficient volume to fill the trough is then placed in the trough. A friction stir welding tool is then traversed longitudinally through the strip whereby the strip fills the trough and is bonded to it. The strip of material does not need to be machined precisely to the shape of the trough, but it has sufficient volume to fill the trough.

U.S. Pat. No. 5,975,406 teaches a method to repair a void in an aluminum alloy plate, particularly a void resulting from friction stir welding. The method includes machining the void to provide a tapered bore through the plate. Grooves and ridges are formed on the sidewall of the tapered bore. A consumable tapered plug of the same aluminum alloy as the plate is inserted into the bore and is rotated as the plug is pressed into the bore. Friction welding occurs at the interface between the plug and the bore and rotation is continued to produce a strong bond consisting of refined and recrystallized fine metal. The weld is then allowed to cool. Subsequently, portions of the plug (referred to as stabs) on each side of the plate are machined away.

U.S. Pat. No. 6,213,379 is directed toward friction stir welding in which requirements of the job make it necessary for all equipment to be located on one side of the work piece. Friction stir welding is done by a plug which is held in a chuck turned by a motor. The proximal end of the plug, which is held by the chuck, has a smaller diameter than the distal end of the plug. The plug may taper from its smaller diameter at the proximal end to its larger diameter at the distal end. The plug is inserted from the back side of the workpiece (on the opposite side from the chuck and motor) and it is pulled toward the chuck. This method, friction plug pull welding, is directed toward repair of tanks such as the propellant tanks for the space shuttle.

U.S. Pat. No. 6,230,957 teaches the use of friction stir welding to repair fusion welds. Passing a friction stir welding tool through a fusion weld converts the cast microstructure to a fine grained, dynamically recrystallized microstructure showing higher strength, ductility, toughness and resistance to weld cracking.

U.S. Pat. No. 6,422,449 presents a method of repairing a friction stir weld by means of inert gas arc welding.

U.S. Pat. No. 6,638,641 provides teaching concerning the exact shape of a rotating member for stir welding, and a recess in a workpiece. In particular, conic sections of rotation are employed for both the rotating member and the recess. These may be paraboloids, spheroids, or conoids. The shape of the rotating member may differ slightly from that of the recess to minimize the torque needed to begin the friction welding process.

The teachings of the aforementioned patents are hereby incorporated into the present application by reference thereto.

INTRODUCTION TO THE INVENTION

The present invention employs friction stir welding and, therefore, is applicable to thermoplastic materials such as metals and thermoplastics. Such materials soften when they are heated. Generally, any material which can be hot forged or hot extruded can be friction stir welded.

The present invention most particularly contemplates friction stir butt welding of two workpieces on a numerically controlled friction stir welding machine. The machine has a vertical spindle which is turned by a motor, and the spindle has a chuck for a friction welding tool. The machine also has a bed which may be translated in any horizontal direction under numerical control. The workpieces are placed on the bed in position for joining, and are clamped to the bed. A backup anvil may be placed underneath the workpieces where they are to be joined.

It is noted that direction-dependent terms such as vertical, horizontal, top, bottom, etc. are employed in this patent only in a relative sense. In the preceding paragraph, what is important is that the bed and spindle may be translated relatively to each other under numeric control in any direction.

The present invention particularly contemplates a situation in which, during a friction welding pass, the tool breaks and remains embedded in the workpiece. This is not uncommon during friction welding due to the very high cyclic stresses which are imposed on the tool. In addition, the present invention contemplates a discrepant portion of a friction stir weld, which needs to be removed and repaired.

A typical prior art response to this situation is to remove the workpieces from the bed and drill a hole on the backside of the workpieces in line with the tool. A punch is then inserted into the hole and it is pounded to remove the tool. A tapered hole is then formed though the workpieces. A tapered plug comprised of the material of the workpieces is machined, the large end of the plug is then grasped in the chuck on the spindle and the plug is friction welded into the tapered hole. Rotation of the plug is continued until a good metallurgical bond is obtained between the plug and the workpieces. The spindle is then stopped and the chuck is disengaged from the plug.

The large end of the plug, which had been gripped by the chuck, is then removed by milling flush with the surfaces of the workpieces, and the small end, which protruded through the tapered hole, is also removed by milling.

As can easily be appreciated, these are time-consuming steps. For example, for milling the ends of the plug, it may be preferable or necessary to employ a milling machine having a spindle with a horizontal axis. This may make it necessary to move the workpieces from one machine to another.

The method of the present invention avoids these steps and, typically, performs the entire repair without removing the workpieces from the bed of the original friction stir welding machine. The first step, which is preferred, but not mandatory, is to make a small tack weld joining the two workpieces at a point ahead of the point which the tool had reached when it broke. This, preferably, is done with a small (i.e. short) friction stir welding tool. The next step is to employ a hole saw or trephining tool to excise a cylindrical plug which includes the broken tool. Alternatively, the plug can be excised by employing a small diameter milling cutter which, while it is rotated about its axis for cutting, is also moved in an orbital manner around the broken tool. The resulting hole has the shape of a right circular cylinder. It is noted that when the tack weld was made, it was positioned, preferably, so it would be on the circumference of the cylindrical hole. It serves to prevent relative movement of the unwelded portions of the two workpieces adjacent the hole during removal of the cylindrical plug containing the broken tool.

A machined plug, having the same composition as the workpieces, is then placed in the cylindrical hole. Typically, it would rest on the backup anvil. It is preferred that the plug be tack welded in place, with a short friction stir welding tool, and then a full depth friction welding tool is used to travel in an orbit continuously around the circumference of the plug to weld the plug to each of the workpieces.

Preferably, after the friction welding tool completes its orbit around the circumference of the plug, then, while still rotating and without being withdrawn from the workpiece (s), the friction stir welding tool proceeds along the interface between the two workpieces to complete the weld.

It is an objective of the present invention to provide a method for repair of friction stir welds which, in some cases, can be accomplished in the same friction stir welding machine as the one on which the original welding is being carried out, while the workpieces remain held in the same locating/holding fixture.

It is an additional objective of the present invention to provide a method for repair of friction stir welds which does not require removal of the partially friction stir welded assemblies to a separate station.

It is another objective of the present invention to provide a method for repairing friction stir welds that does not require precise re-alignment between the locating/holding fixture and the friction stir welding tool.

It is a further objective of the present invention to provide a method for repair of friction stir welds which employs the same process and system to repair and also weld the workpieces.

It is yet another objective of the present invention to provide a highly repeatable process for repair of friction stir welds.

It is also an objective of the present invention to provide a process for friction stir welding which employs the same numerically controlled machine for both repair and welding.

It is a further objective of the present invention to employ one or more friction tack welds to immobilize a repair plug to facilitate friction stir welding it into place.

It is an additional objective of the present invention to provide means for repairing a backup anvil after a friction stir weld repair.

SUMMARY OF THE INVENTION

In one aspect, the present invention is a method for repairing a friction stir weld wherein a friction stir weld is being made along a joint between a first workpiece and a second workpiece, and wherein a first friction stir welding tool has broken and become embedded in the workpieces, or a situation in which a discrepant portion (i.e. having voids) has to be removed and repaired. The method includes: excising the broken tool or discrepant portion by cutting, milling or otherwise removing workpiece material surrounding the broken tool or discrepancy so as to remove the broken tool or discrepancy and form a cylindrical hole in the workpieces. A cylindrical plug is then placed in the cylindrical hole, and a second friction stir welding tool is moved around the circumference of the plug to weld the plug to the workpieces.

In another aspect, the present invention is a method of repairing a discrepant feature in a casting, weldment, forging, or other workpiece comprised of a material characterized by thermoplastic properties. The method includes excising the discrepant feature by cutting, milling, or otherwise removing workpiece material surrounding the discrepant feature so as to remove the discrepant feature and form a cylindrical hole in the workpiece. The method further includes placing a cylindrical plug in the cylindrical hole and moving a friction stir welding tool around the circumference of the plug to weld the plug to the workpiece.

In an additional aspect, the present invention is a method of repairing a discrepant area in a casting, weldment, or other workpiece comprised of a material characterized by thermoplastic properties. The method includes placing the workpiece on a backup anvil, and excising the discrepancy by cutting, milling, or otherwise removing workpiece material surrounding the discrepancy so as to remove the discrepancy and form a cylindrical hole in the workpiece. A cylindrical plug is then placed in the cylindrical hole and a friction stir welding tool is moved around the circumference of the plug to weld the plug to the workpiece. The method further includes repairing the backup anvil.

DETAILED DESCRIPTION OF PREFERRED EMBODIMENTS

The methods of the present invention are applicable to materials having thermoplastic properties, that is to say, materials which soften upon heating.

Figure 1:
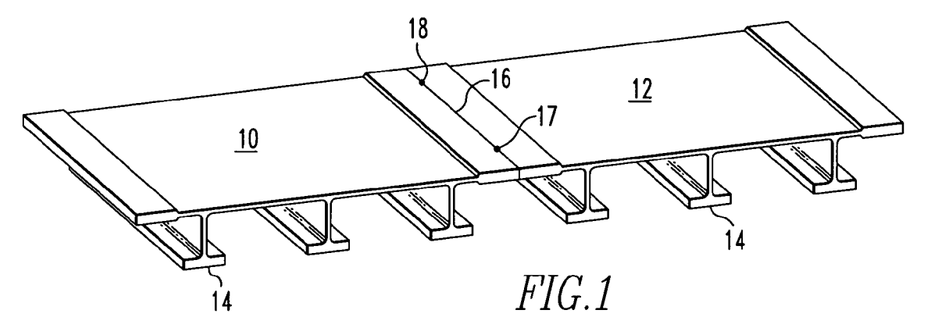
FIG. 1 is a sketch of two integrally stiffened panels which are juxtaposed for joining by friction stir welding.

Attention is directed to FIG. 1, which illustrates workpieces 10 and 12 positioned for friction stir welding along the joint 16. The methods of the present invention are applied to workpieces 10 and 12 having thermoplastic properties. Workpieces 10 and 12 have integral stiffening members 14. Integral stiffening members 14 are not relevant to the present invention, but are included in the drawings because they are typical in parts to be joined by friction stir welding. Workpieces 10 and 12 are clamped by known means (not shown) to the bed (not shown) of a numerically controlled friction stir welding machine. A weld is required along joint 16 between first workpiece 10 and second workpiece 12. The friction stir welding pass is to be started at point 17 and be continued to point 18.

Figure 2:
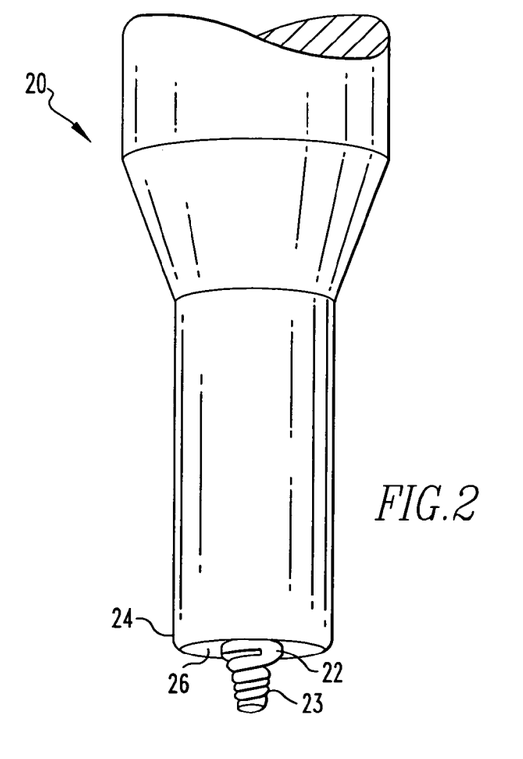
FIG. 2 is a schematic illustration of a tool used for friction stir welding.

FIG. 2 shows the tool 20 employed by a friction stir welding machine. Tool 20 includes a probe 22 which is plunged into the workpiece(s) to perform the friction stir welding. Tool 20 would, typically, be held in the chuck of the friction stir welding machine (not shown) with the probe 22 downward. Tool 20 is caused to rotate and then, while rotating, probe 22 is plunged into the workpieces at point 17 to begin the stir welding pass. A person skilled in the art will recognize that tool 20 operates by heating the workpieces by friction between the probe 22 and the workpieces 10 and 12 to plasticize the workpieces. During friction stir welding, the temperature generally remains below the melting point of the workpieces. For aluminum alloys, the temperature is typically about 550 C. Plasticized material adjacent the probe 22 is caused to flow around probe 22 by the rotation of the probe, thus intermingling material from workpiece 10 and workpiece 12. A solid state bond is thus produced between workpiece 10 and workpiece 12.

Friction stir welding is similar to the extrusion process in that the worked material is heated to its softening point, and then caused to flow. Generally, in neither case, is the material melted.

Friction stir welding tool 20 also includes a shoulder 24 which constrains the plasticized material from flowing upwards and out of the joining area. Preferably, shoulder 24 has a concave end 26, which serves to contain plasticized material. It is presently preferred that probe 22 be tapered and include threads 23. The direction of rotation of tool 20 is opposite to the rotation which would cause probe 22 to screw itself into workpieces 10 and 12 as a self-threading screw. The direction of rotation is such that threads 23 tend to cause plasticized material to move downward, into the workpieces. This type of welding has the advantage, relative to fusion welding, that formation and entrainment of oxides is much less a problem. Also, it generally results in a fine grain structure, and the process tends not to produce voids. For the case illustrated here, friction stir welding tool 20 is a full penetration friction stir welding tool.

During a normal friction stir welding pass, the probe 22 of tool 20 would, while rotating, be plunged into the workpieces at initial point 17 on the joint 16 between workpiece 10 and workpiece 12. While the tool 20 continues to rotate, it is moved along the joint 16 toward the final point 18. As it proceeds, it continues to sustain the adiabatic friction heating within the plasticized region adjacent to the probe, and to cause flow of the plasticized material of workpieces 10 and 12 so that they intermingle. Generally, the surface of the weld produced is fairly smooth due to the shoulder 24 of tool 20.

The probe 22 of friction stir welding tool 20 is subjected to very high static and cyclic stresses and elevated temperatures. Consequently, a friction stir welding probe such as probe 22 will sometimes break and will remain embedded in the welded joint between workpieces 10 and 12. It is a particular purpose of the present invention to recover from that situation.

Figure 3:
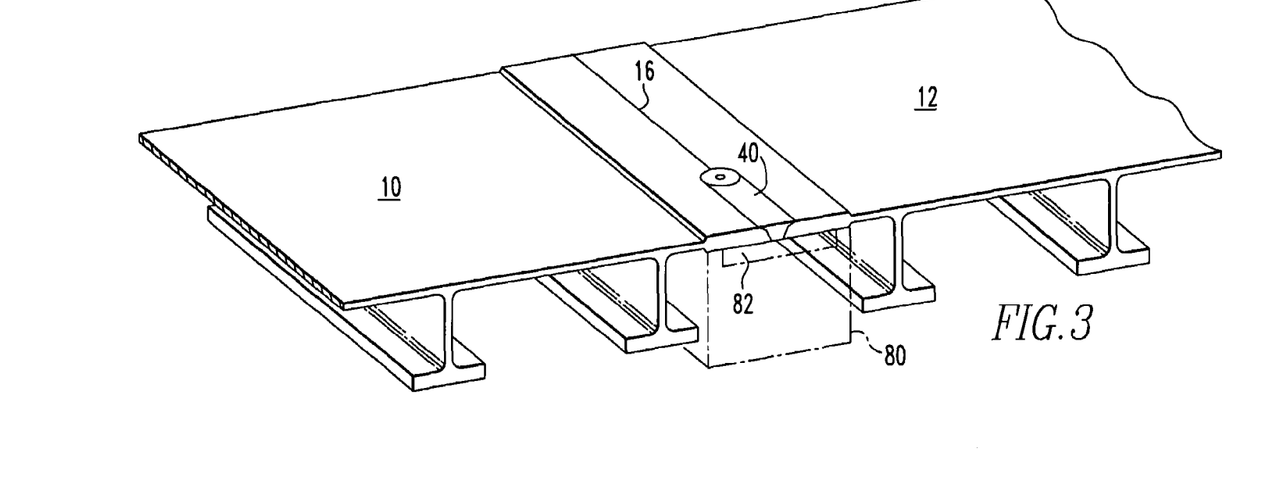
FIG. 3 is an illustration of a partially completed friction stir weld joining the panels shown in FIG. 1, and it shows a broken friction stir welding tool.
Figure 4:
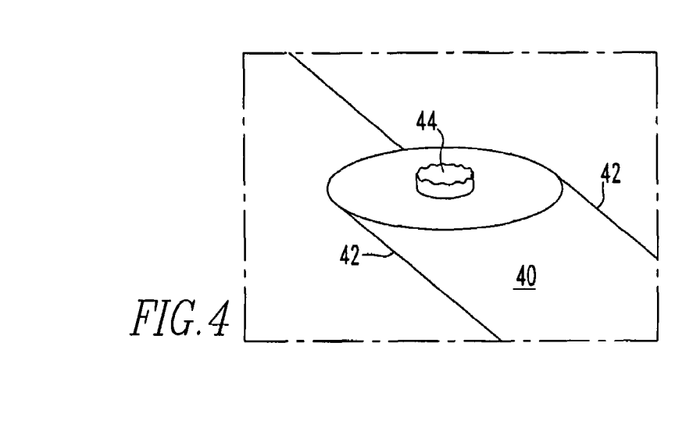
FIG. 4 is a close-up of the broken tool embedded in the panels.

FIG. 3 and the magnified view in FIG. 4 illustrate this condition. These figures show a partially completed friction stir weld, 40 having edges 42. These figures also show the broken probe 44.

Figure 5:
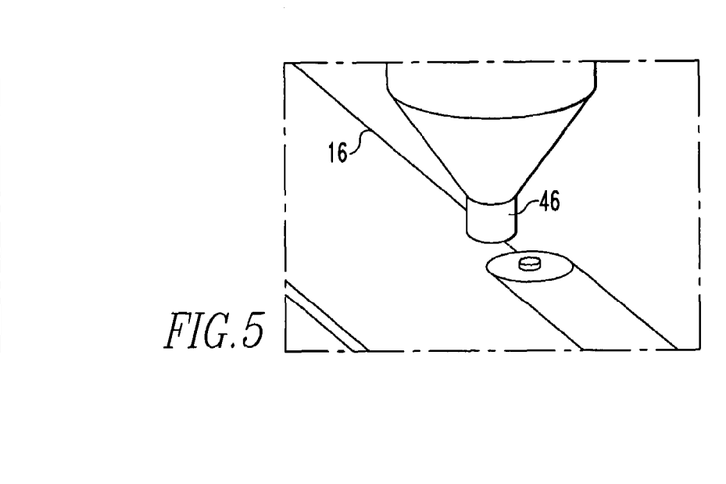
FIG. 5 is a schematic illustration of a small friction stir welding tool making a friction tack weld on the joint between the two panels at a point ahead of the broken tool.

FIG. 5 illustrates a step which is an optional part of the present invention. In this optional step, a small (i.e. short) friction stir welding tool 46 is used to make a tack weld 48 (best seen in FIG. 7) on joint 16 ahead of the broken probe 44.

Figure 6:
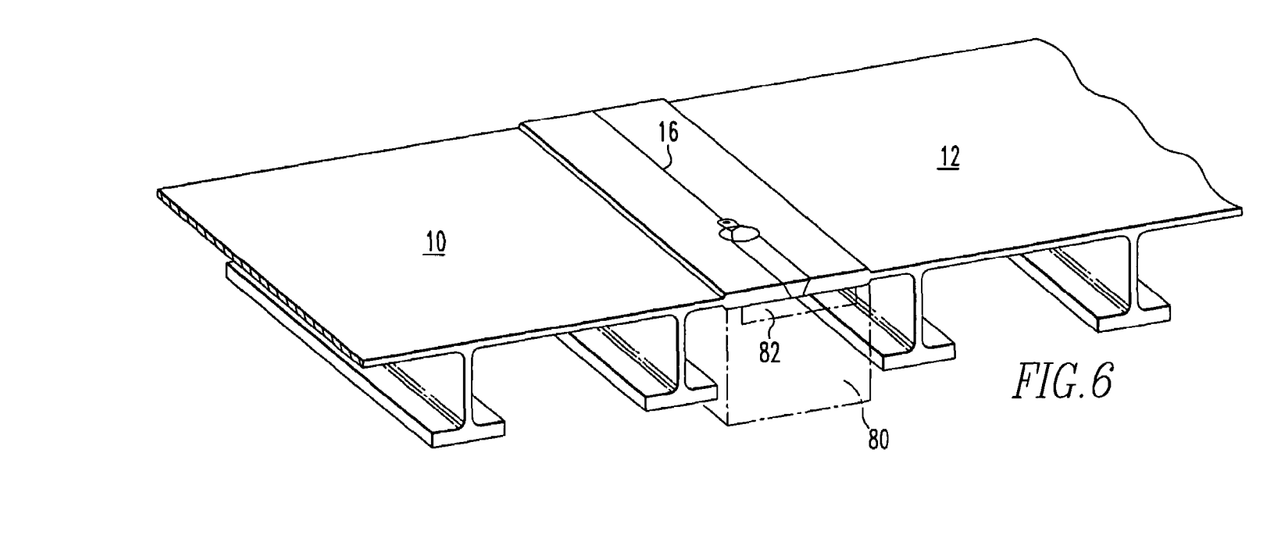
FIG. 6 is a view showing the panels and a hole left after the broken tool has been excised.
Figure 7:
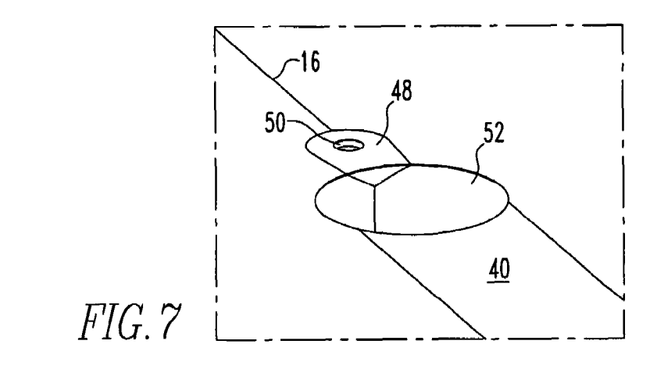
FIG. 7 is a detail of the hole shown in FIG. 6.

FIGS. 6 and 7 illustrate the next step, which is to cut around the perimeter of the broken probe 44 to remove it, and leave a cylindrical hole 52. This step may be accomplished by a hole saw or a trepanning tool. It may also be done by causing, under numeric control, a small diameter cutting tool to move orbitally around the broken probe 44. It is noted that this orbital motion is in addition to the rotary cutting motion of the tool.

The purpose of the tack weld 48 can be understood from FIG. 7. It serves to prevent relative separation and movement of workpieces 10 and 12 along joint 16 as hole 52 is cut. FIG. 7 shows the exit hole 50 from which the small friction stir welding tool 46 was withdrawn after the friction tack weld 48 was completed.

At this point, it is relevant to note that a backup anvil 80, shown in phantom in FIGS. 3 and 6, is placed underneath joint 16 between work pieces 10 and 12 prior to beginning the friction welding pass.

Figure 8:
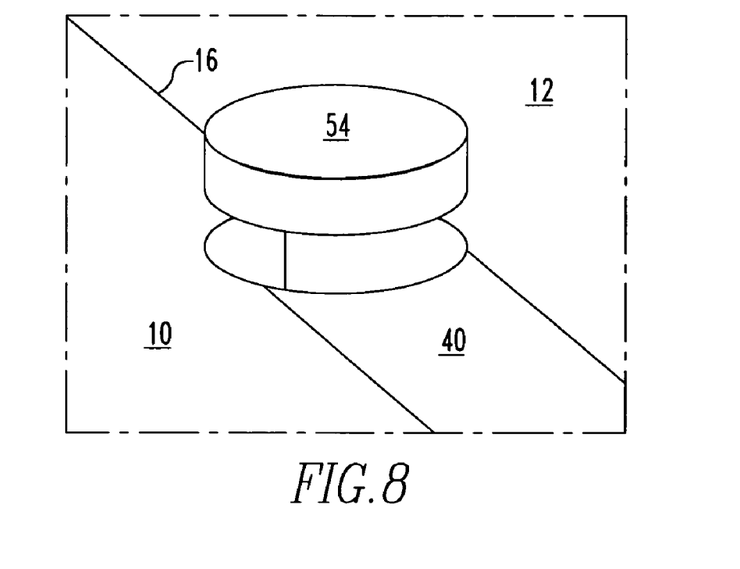
FIG. 8 is a sketch showing a machined plug being placed in the hole shown in FIGS. 6 and 7.
Figure 9:
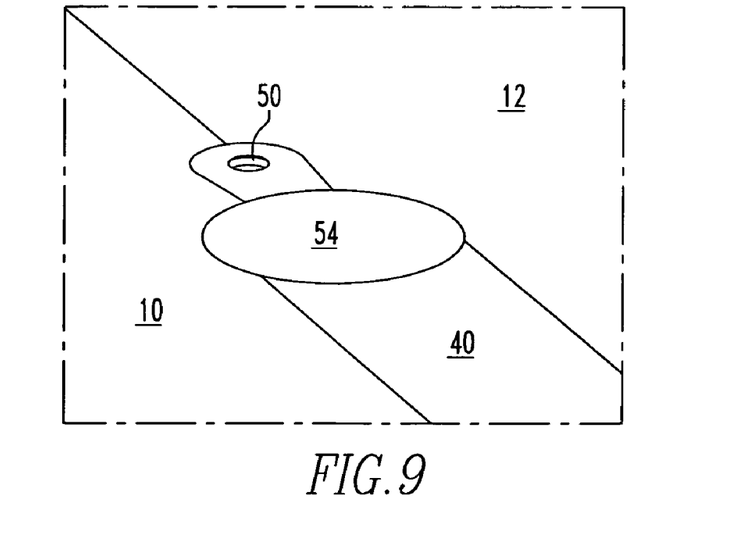
FIG. 9 is a view of the plug lying flush in the hole.

Preferably, hole 52 is cut through tack weld 48, as shown in FIG. 7. After hole 52 is cut, a cylindrical plug 54 having about the same diameter as hole 52 and the same thickness as workpieces 10 and 12 along joint 16, is placed in hole 52, as shown in FIG. 8. Plug 54 rests on anvil 80 and, preferably, is flush with the upper surfaces of the workpieces 10 and 12, as shown in FIG. 9. Preferably, the diameter of plug 54 is equal to or is slightly less than the diameter of hole 52, whereby the diametral clearance between plug 54 and hole 52 is from 0.0 to 0.05 mm.

Figure 10:
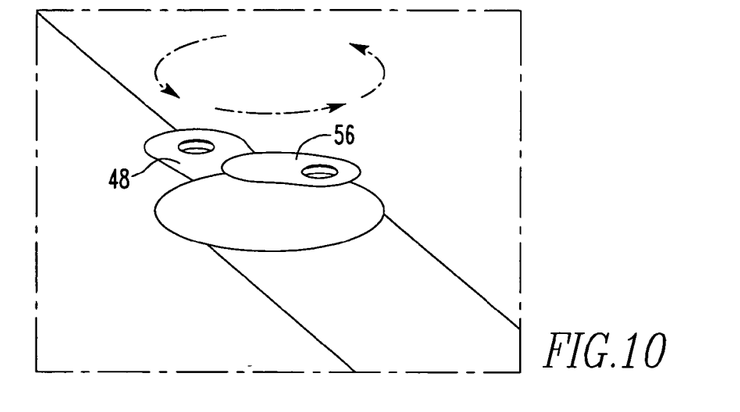
FIG. 10 is an illustration of the first of three friction stir tack welds used to immobilize the plug.
Figure 11:
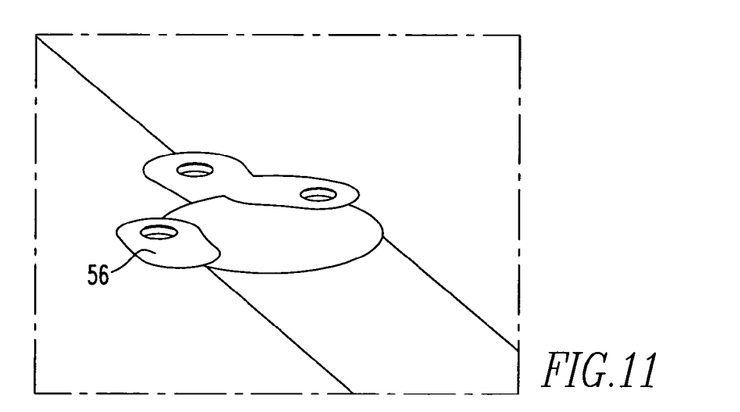
FIG. 11 is an illustration of the second of three tack welds used to immobilize the plug.
Figure 12:
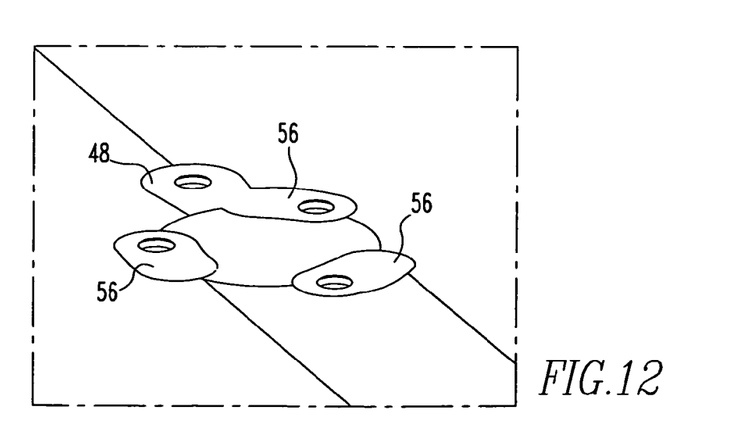
FIG. 12 is an illustration of the third tack weld.

FIGS. 10, 11 and 12 show optional steps which, preferably, are taken to immobilize plug 54 before a full penetration friction stir weld is made to weld plug 54 into hole 52. The small friction stir welding tool 46 (FIG. 5) is, preferably, employed to make the first tack weld 56 shown in FIG. 10. It is then employed to make the second tack weld 56 shown in FIG. 11, and then the third tack weld 56 shown in FIG. 12. Preferably, these are disposed 120 degrees apart around the circumference of plug 54, as shown in these figures. The short friction stir welding tool 46 is moved orbitally in the direction 57 indicated in FIG. 10 as the tack welds are made.

Figure 13:
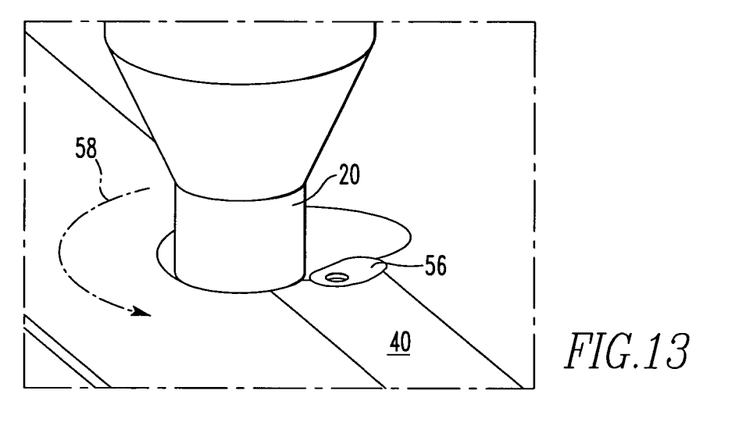
FIG. 13 is a schematic illustration of a friction stir welding tool beginning to weld the plug in place.
Figure 14:
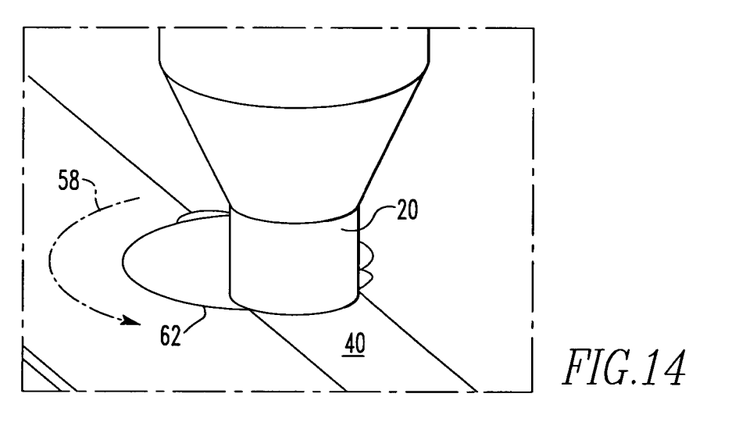
FIG. 14 is a schematic illustration showing the friction stir welding tool continuing to weld the plug to the panels.
Figure 15:
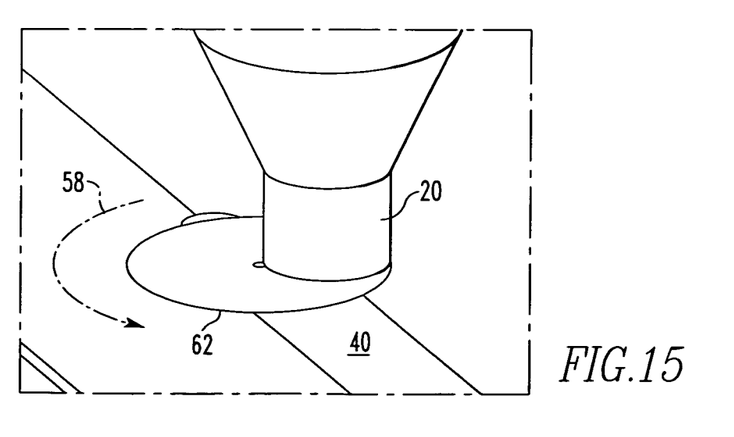
FIG. 15 is a schematic illustration of the friction stir welding tool concluding its orbital path around the circumference of the plug.
Figures 16, 17:
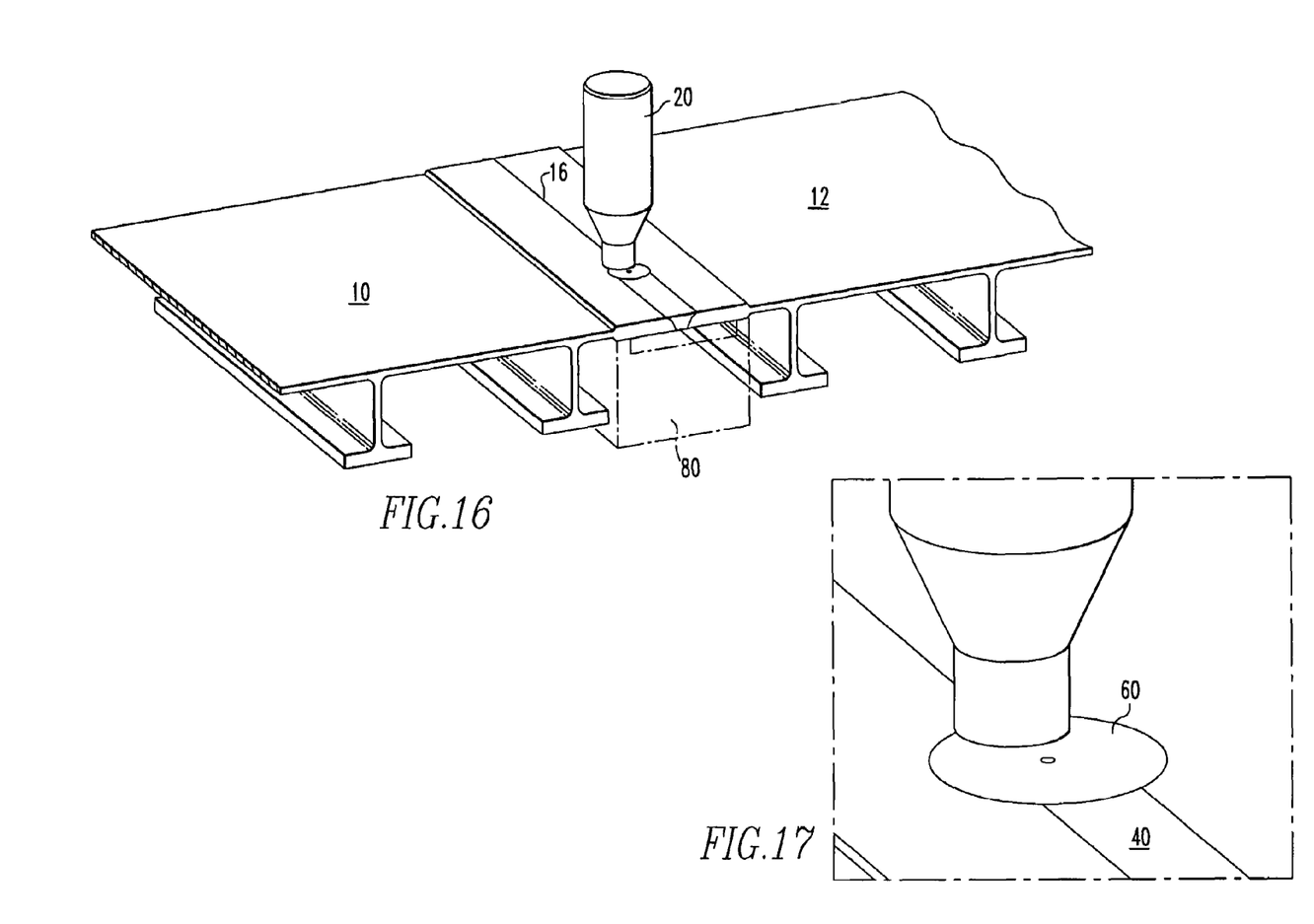
FIG. 16 is a view of the friction stir welding tool after it has finished welding the plug and is beginning to recommence the welding pass which was interrupted by the failure of the original tool.
FIG. 17 is a detail of the friction stir welding tool as it is beginning to recommence the welding pass.
Figure 18:
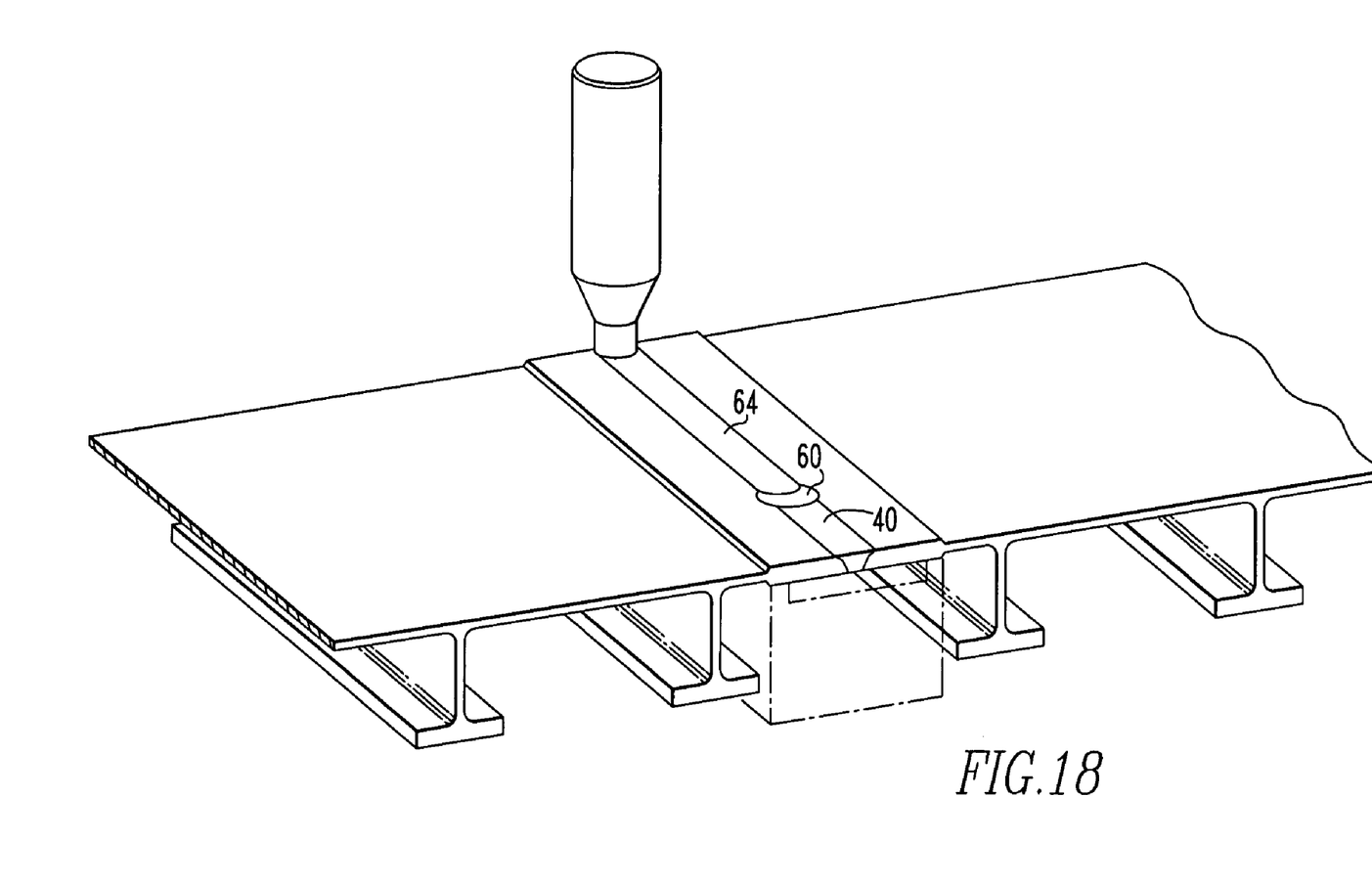
FIG. 18 is a view of the friction stir welding tool after it has finished welding the integrally stiffened panels.

FIGS. 13, 14 and 15 show a new full penetration friction stir welding tool 20 which is plunged into workpieces 10 and 12 after the tack welds 56 are made. Tool 20 is then, under numeric control, caused to move orbitally around the perimeter 62 of repair plug 54. After completing the orbital welding pass, the tool 20 is then located, as shown in FIGS. 16 and 17 at the joint 16. Tool 20, while still rotating, is then moved along joint 16 to end point 18 (shown in FIG. 1). The friction stir weld repair is then complete, as shown in FIG. 18. The completed weld includes the friction stir weld 40 which was made before the failure of probe 22, the friction stir welded area 60, and the continued friction stir weld 64. An exit hole will remain at point 18, but that is consistent with the original plan for the friction stir weld, which was to be completed at point 18. For many applications, no further machining steps will be required for the weldment comprising the first workpiece 10 and the second workpiece 12.

The weldment produced by this process will, generally, have a microstructure which reveals the process. For example, the first workpiece 10 and second workpiece 12 have a microstructure characteristic of extrusions or castings. The joint 16, after friction stir welding, and also the friction stir welded area 60 which incorporates the plug 54 into the workpieces, has a microstructure characteristic of friction stir welding. Typically, the friction stir welded areas will have a finer grain size than portions of workpiece 10 and workpiece 12 which were not altered by friction stir welding.

It is noted that, at no point in the preceding procedure, was it necessary to move the workpieces to a different machine, or to mount them in a different position on the same machine. All the preceding steps are performed with a minimum of human intervention, being performed, principally, by the numerically controlled friction stir welding machine.

Figure 19:
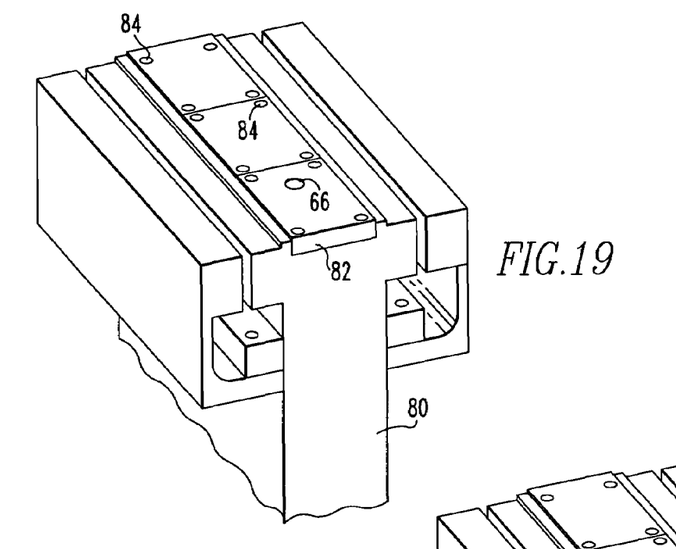
FIG. 19 is an illustration of a backup anvil with a hole which was formed when the broken stir welding tool was excised from the panels.
Figure 20:
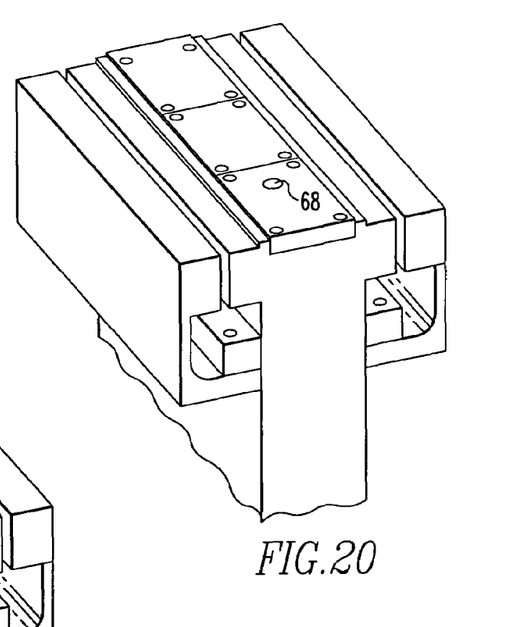
FIG. 20 is an illustration showing a plug placed in the hole in the anvil.
Figure 21:
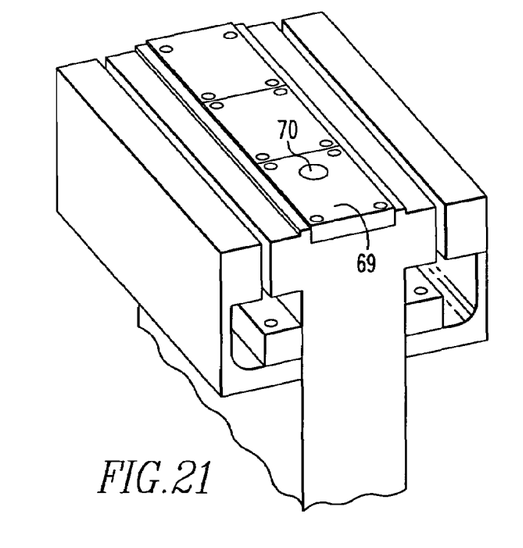
FIG. 21 is an illustration of the plug fusion welded to the anvil and machined smooth.

Some repair may, however, be required for the anvil 80. FIG. 19 shows the anvil 80 with a hole 66 which was formed when the broken probe 44 (FIG. 4) was excised from the workpiece(s) 10 and 12. In FIG. 20, a plug 68 is placed in the hole, and in FIG. 21, it is welded in place, preferably by gas metal arc welding. It is then machined flat whereby the welded and machined plug 70 is flush with the top surface 69 of anvil pad 82.

Figure 22:
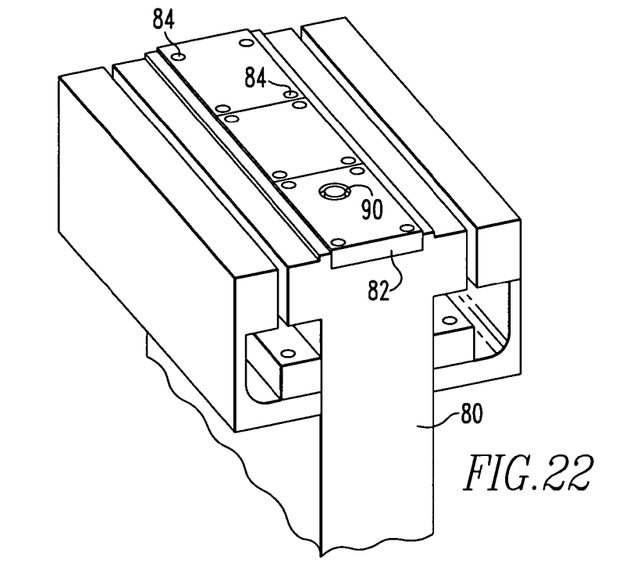
FIG. 22 is a schematic illustration of an anvil with an annular recess formed during removal of a broken tool.

FIG. 22 shows an anvil 80 designed for replacement of pads. Three pads 82 are shown. These are secured by shoulder bolts 84. Prior to performing the friction stir welding of joint 16, anvil 80 would be positioned so pads 82 lie under joint 16. Individual pads 82 may economically be discarded, rather than repaired.

Figure 23:
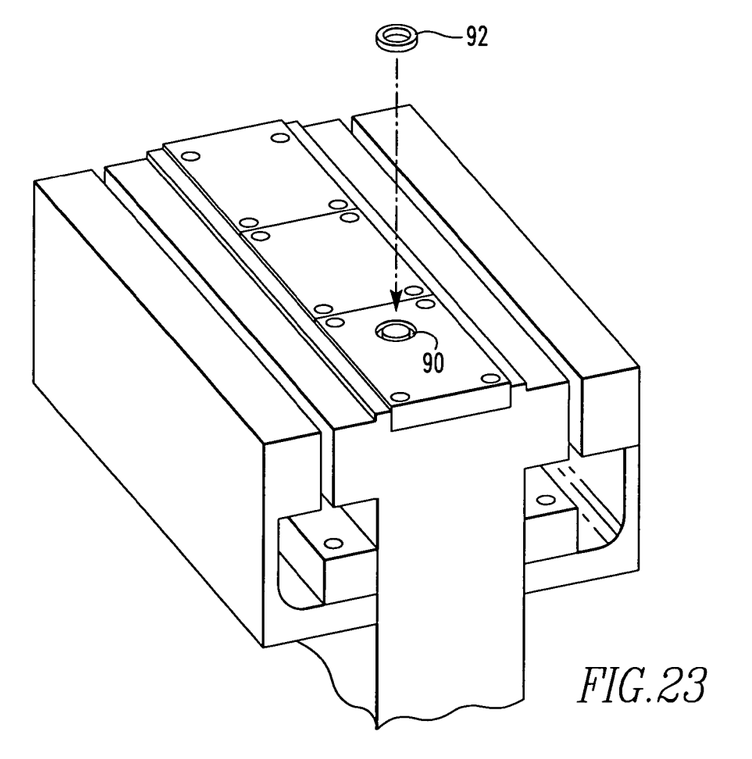
FIG. 23 is an illustration of a ring employed to repair the annular recess shown in FIG. 22.

FIG. 23 shows repair of an anvil pad 82 having an annular groove 90. The preferred repair comprises forming a ring 92 to fit into groove 90. Ring 92 is then pressed into groove 90 to repair anvil pad 82.

The repair method described above is not limited to the repair of friction welds interrupted by broken friction stir welding tools. In general, the method can be applied to any localized discrepancy in any thermoplastic material. Generally, materials which can be formed by hot forging, extruding, etc can be repaired by the method of the present invention.

The method broadly comprises:
(1) Forming a cylindrical hole which removes the discrepancy.
(2) Placing a cylindrical plug in the hole, the plug closely fitting inside the hole.
(3) Optionally tack welding the plug in place.
(4) Employing a friction stir welding tool to move around the circumference of the plug and weld it to the workpiece.
(5) Optionally moving the friction stir welding tool to a place in the workpiece where an exit hole is acceptable, or where the exit hole can be repaired without harming the workpiece.

The presently preferred embodiments having been described above, it is to be understood that the invention may be otherwise embodied within the scope of the following claims.

We claim:

1. A method of repairing a discrepancy formed on a friction stir welded portion of a joint between a first and at least a second workpiece, said method comprising:
excising the discrepancy by removing workpiece material surrounding the discrepancy so as to remove the discrepancy and form a cylindrical hole in the workpiece;
placing a cylindrical plug in the cylindrical hole; and
moving a friction stir welding tool around the circumference of the plug to weld the plug to the workpiece.

2. The method of claim 1 further comprising the step of tack welding the cylindrical plug to the workpiece to immobilize the cylindrical plug before the friction stir welding tool is employed to weld the cylindrical plug to the workpiece.

3. The method of claim 2 wherein the step of tack welding the cylindrical plug to the workpiece includes placing three tack welds spaced apart by about 120 degrees around the circumference of the cylindrical plug.

4. The method of claim 1 wherein a diametral clearance between the cylindrical plug and the cylindrical hole is from 0.00 to 0.05 mm.

5. The method of claim 1 wherein a top surface of the cylindrical plug is about flush with a top surface of the workpiece.

6. The method of claim 1 wherein a bottom surface of the cylindrical plug is about flush with a bottom surface of the work-piece.

7. The method of claim 1 further including a step of placing a backup anvil behind the workpiece, said backup anvil being for withstanding the forging force in the downward direction by the tool during friction stir welding of the cylindrical plug.

8. The method of claim 1 comprising cutting or milling to excise the discrepancy.

9. The method of claim 1 wherein the first and at least the second workpiece comprise a casting, weldment, forging, or extrusion comprised of a metal or thermoplastic material.

10. A method for removing a discrepancy formed in a weld between at least two workpieces comprising:
   removing the discrepancy from the weld between the at least two workpieces by removing workpiece material surrounding the discrepancy so as to form a hole;
   placing a plug in the hole; and
   friction stir welding the interface between plug and the at least two workpieces in which the hole is formed.

11. The method of claim 10 comprising contacting the at least two workpieces with a backup anvil prior to removing the discrepancy.

12. The method of claim 11 wherein the step of repairing the backup anvil includes the step of replacing an anvil pad.

13. The method of claim 11 wherein the damage to the backup anvil includes a ring-shaped cut in the backup anvil, the step of repairing the backup anvil comprising:
   forming a ring to fit in the ring-shaped cut in the backup anvil; and
   pressing the ring into the ring-shaped cut.

14. The method of claim 11 wherein the damage to the backup anvil includes a hole in the backup anvil, the step of repairing the backup anvil comprising;
   placing a plug in the hole in the backup anvil; and
   welding the plug into the hole.

15. The method of claim 14 wherein the step of welding the plug into the hole is preformed by gas metal arc welding.

16. The method of claim 14 further comprising:
   machining the welded plug flash with a surface of the backup anvil.

17. The method of claim 11 further comprising repairing damage to the backup anvil at least after friction stir welding the plug to the interface of the at least two work pieces.

18. A method for repairing a friction stir weld wherein a friction stir weld is being made along a joint between a first workpiece and a second workpiece, and wherein a first friction stir welding tool has broken and become embedded in the workpieces, or a discrepant weld segment has developed, the method comprising:
   excising the broken tool or discrepant weld segment by removing workpiece material surrounding the broken tool or discrepant segment so as to remove the broken tool or discrepant segment and form a cylindrical hole in the workpieces;
   placing a cylindrical plug in the cylindrical hole; and
   moving the first friction stir welding tool or a second friction stir welding tool around time circumference of the plug to weld the plug to the workpieces.

19. The method of claim 18 wherein the step of excising the broken tool or discrepant weld segment is preceded by a step of:
   tack welding the first workpiece to the second workpiece at a place on the joint ahead of the broken tool or discrepant segment.

20. The method of claim 19 wherein the tack weld is positioned so that at least a portion of the tack weld remains on a periphery of the cylindrical hole after the step of excising the broken tool and forming the cylindrical hole.

21. The method of claim 18 further comprising a step of tack welding the cylindrical plug to the workpieces to immobilize the cylindrical plug before the second friction stir welding tool is employed to weld the cylindrical plug to the workpieces.

22. The method of claim 21 wherein the step of tack welding die cylindrical plug to the workpieces includes placing three tack welds spaced apart by about 120 degrees around the circumference of the cylindrical plug.

23. The method of claim 18 wherein a diametral clearance between the cylindrical plug and the cylindrical hole is from 0.00 to 0.05 mm.

24. The method of claim 18 wherein a top surface of the cylindrical plug is flush with a top surface of the workpieces.

25. The method of claim 18 wherein a bottom surface of the cylindrical plug is about flush with a bottom surface of the workpieces.

26. The method of claim 18 further comprising:
   employing the second friction stir welding tool to finishing welding the joint.

27. The method of claim 26 wherein the step of finishing welding the joint is done following the step of welding the plug to the workpieces without withdrawing the friction stir welding tool from the workpieces.

28. The method of claim 27 wherein the step of finishing welding the joint is done following the step of welding the plug to the workpieces without stopping rotation of the friction stir welding tool.

29. The method of claim 18 comprising cutting or milling to excise the broken tool or discrepant weld segment.

* * * * *

UNITED STATES PATENT AND TRADEMARK OFFICE
CERTIFICATE OF CORRECTION

PATENT NO. : 7,281,647 B2  
APPLICATION NO. : 10/875106  
DATED : October 16, 2007  
INVENTOR(S) : Israel Stol and Eric M. Stull

It is certified that error appears in the above-identified patent and that said Letters Patent is hereby corrected as shown below:

In column 8, line 67, line 3 of claim 6, delete "work-piece" and insert --workpiece--.

In column 10, line 6, line 14 of claim 18, after "around", delete "time" and insert --the--.

Signed and Sealed this

Twenty-fifth Day of December, 2007

JON W. DUDAS  
*Director of the United States Patent and Trademark Office*